US008410200B2

(12) United States Patent
Oakley et al.

(10) Patent No.: US 8,410,200 B2
(45) Date of Patent: Apr. 2, 2013

(54) POLYMERIC FILMS

(75) Inventors: Nicholas R. Oakley, Lara (AU);
Nicholas J. McCaffrey, Burwood (AU);
Kishan C. Khemani, Williamstown (AU)

(73) Assignee: Plantic Technologies Limited, Altona, Victoria (AU)

( * ) Notice: Subject to any disclaimer, the term of this patent is extended or adjusted under 35 U.S.C. 154(b) by 611 days.

(21) Appl. No.: 12/297,523

(22) PCT Filed: Apr. 18, 2007

(86) PCT No.: PCT/AU2007/000495
§ 371 (c)(1),
(2), (4) Date: May 5, 2009

(87) PCT Pub. No.: WO2007/118280
PCT Pub. Date: Oct. 25, 2007

(65) Prior Publication Data
US 2009/0312462 A1   Dec. 17, 2009

(30) Foreign Application Priority Data
Apr. 18, 2006 (AU) .............................. 2006901982

(51) Int. Cl.
*C08L 3/00* (2006.01)
*B32B 27/18* (2006.01)
*B32B 27/22* (2006.01)

(52) U.S. Cl. ............... 524/47; 524/48; 524/49; 524/50; 524/51; 524/52; 524/53; 524/284; 524/110; 524/388; 525/54.3; 525/54.31; 525/56; 525/58; 428/480; 428/532; 428/483; 428/516

(58) Field of Classification Search ............. 524/47, 524/48, 49, 50, 51, 52, 53, 110, 284, 388; 525/54.3, 54.31, 56, 58; 428/480, 532, 483, 428/516
See application file for complete search history.

(56) References Cited

U.S. PATENT DOCUMENTS

| | | | |
|---|---|---|---|
| 3,312,641 A | 4/1967 | Young | |
| 3,316,190 A | 4/1967 | Suzumura et al. | |
| 5,322,866 A | 6/1994 | Mayer et al. | |
| 5,393,804 A | 2/1995 | George et al. | |
| 5,462,981 A | 10/1995 | Bastioli et al. | |
| 5,512,090 A | 4/1996 | Franke et al. | |
| 5,902,262 A * | 5/1999 | Bastioli et al. | 604/1 |
| 6,608,121 B2 | 8/2003 | Isozaki et al. | |
| 2006/0008605 A1 | 1/2006 | Boswell et al. | |

FOREIGN PATENT DOCUMENTS

| | | |
|---|---|---|
| EP | 0512360 A1 | 11/1992 |
| EP | 0539604 A1 | 5/1993 |
| EP | 0635545 | 1/1995 |
| EP | 0758669 | 2/1997 |
| EP | 0400531 | 4/1997 |
| JP | 57198771 | 12/1982 |
| JP | 10296820 | 11/1998 |
| WO | 92/02363 A1 | 2/1992 |
| WO | 9216583 | 10/1992 |
| WO | 92/19680 A1 | 11/1992 |
| WO | 9403543 | 2/1994 |
| WO | 99/13003 A1 | 3/1999 |
| WO | 0036006 | 6/2000 |
| WO | 01/74555 A1 | 10/2001 |
| WO | 02074352 | 9/2002 |
| WO | 2006037157 | 4/2006 |
| WO | 2006043264 | 4/2006 |
| WO | WO 2006/037157 | * 4/2006 |

OTHER PUBLICATIONS

Supplementary European Search Report issued in corresponding European Patent Application No. 07718742 dated Jan. 16, 2012 (1 page).

* cited by examiner

*Primary Examiner* — Robert D. Harlan
(74) *Attorney, Agent, or Firm* — Kilyk & Bowersox, P.L.L.C.

(57) ABSTRACT

A polymer composition and its use for thin film packaging applications including on a dry basis: a) from 45 to 90% by weight of starch; b) from 0.1 to 15% by weight of a water soluble polymer selected from polyvinyl alcohol, polyvinylacetate, and copolymers of ethylene and vinyl alcohol which have a melting point compatible with the molten state of the starch component; and c) from 5 to 45% by weight of one or more plasticizers having a molecular weight in the range of 50-6000, more preferably 50-2500 and more preferably still 100-400 and desirably selected from the group consisting of sorbitol, glycerol, maltitol, xylitol, mannitol, erythritol, glycerol trioleate, tributyl citrate, acetyl tri-ethyl citrate, glyceryl triacetate, 2,2,4-trimethyl-1,3-pentanediol diisobutyrate, polyethylene oxide, ethylene glycol, diethylene glycol or polyethylene glycol.

23 Claims, No Drawings

POLYMERIC FILMS

CROSS REFERENCE TO RELATED APPLICATIONS

This application is a National Phase filing under 35 U.S.C. §371 of PCT/AU2007/000495 filed Apr. 18, 2007, which claims priority to Patent Application No. 2006901982, filed in Australia on Apr. 18, 2006. The entire contents of each of the above-applications are incorporated herein by reference.

This invention relates to films for use in packaging. The films may be particularly useful in preventing transfer of gases such as water vapour, carbon dioxide, oxygen and nitrogen into and out of packed products. This is particularly important in the packaging of solid and liquid foodstuffs but is also relevant for other applications such as consumer products including paper products, sanitary items, laundry and kitchen products where it is important to keep the packed product fresh and hydrated, or alternately, dry and inaccessible to, for example, moisture ingress. The need to keep the contents of a package dry is also relevant in the wrapping of items such as silage and newspapers. In many instances it is also necessary to consider the possibility of chemical interaction between the packaging and the product.

BACKGROUND OF THE INVENTION

The efficient plastic packaging of products of many different shapes, chemical nature and purpose is a significant challenge. Keeping food and drink fresh is a particularly demanding sector where shelf life can vary widely from product to product and serving size can vary considerably. The greatest cause of spoilage in food and drink is oxygen infiltration leading to oxidation of the product. Most common packaging materials which are aesthetically satisfactory for thin film packaging are very poor at stopping gas transfer into and out of packaged food. Over the last thirty years an industry has developed in providing barrier film layers. These films are used to stop the transfer of gases such as water vapour, $O_2$, $CO_2$ and $N_2$ into and out of food and beverages.

Plastic has been used as a packaging material for over sixty years and is continuing to evolve through increasing demands from the market and through technical development. The commodity plastics such as polyethylene terephthalate (PET), polypropylene (PP), polyvinyl chloride (PVC) and polyethylene (PE) all have some barrier properties against the ingress or egress of $O_2$ and $H_2O$. These barrier properties are usually proportional to the thickness of the barrier layer. Three factors drive the need for plastics with better barrier properties; firstly the move away from glass and tin/aluminium because of their weight, cost and in the case of glass, its fragility; secondly the down gauging of plastic materials to make them more economic, and thirdly the requirement for extended shelf life as more food is packaged into ever smaller serving sizes.

These factors have led to the development of materials that significantly enhance the barrier properties of common consumer plastic packaging. The first successful high performance barrier material was polyvinylidene chloride (PVDC). It is a derivative of PVC and therefore is seen to have a similar negative environmental profile. The other common barrier materials on the market today are ethylene vinyl alcohol copolymer (EVOH), nylons (e.g. MXD6) and nitriles. These are all used as a barrier layer in addition to the structural layer provided by the commodity plastics.

The only natural polymer that has been commercialized that can be used as a barrier material is cellophane which was developed well before much of the plastics industry. Its barrier properties to oxygen are not considered high performance compared to today's barrier resins and its cost is high.

A common barrier structure of the wall of PET (polyethylene terephthalate) drink bottles is a multi-layer structure consisting of PET structural layers around a core layer or layers containing higher-priced barrier materials. U.S. Pat. Nos. 5,498,662, 5,621,026, 5,897,960 and 6,143,384 disclose the use of polymethacrylic acid polymer and polysaccharides in barrier layers. WO 00/49072 discloses barrier coatings based on clays such as montmorillonite spray coated onto PET blow moulded bottles. USA application 2004/0087696 discloses a water based coating for PET containers in which a clay material is mixed with a melamine, formaldehyde and boric acid binder and an organic water soluble binder such as polysaccharides and cellulose materials.

Barrier materials are used in a host of different plastic structures and processes and each of these imposes its own functionality requirements. The most common use of barrier structures is in thin films for wrapping foods such as confectionery, fresh food, bakery products and the plethora of pouches of instant, convenience foods such as flavourings and dehydrated sauce bases which have appeared in the market in recent years. Some of these films are highly complex laminates which can have 12 layers and yet be less than 50 μm thick. Lamination of plastics is also challenging. These films are typically produced through co extrusion. WO 90/14938 discloses a high amylose modified starch that is suitable for use in oxygen barrier laminates. U.S. Pat. Nos. 6,569,539 and 6,692,801 disclose a paper and/or plastic laminate with an inner barrier coating of a starch or modified starch applied from a dispersion. WO04/052646 discloses a multilayer barrier film using a starch layer and a biodegradable polyester layer. USA application 2002/0187340 discloses a gas barrier coating of polyvinyl alcohol and starch in which the predominant material is starch and the material is applied from a dispersion.

Barriers are also used in bottles for fruit juice, in some carbonated soft drinks and in various hot filled foods such as fruit and vegetable preserves. Bottles are usually formed through co-injection stretch blow moulding. This requires the materials to be both injection moulded into a preform and then remelted and blown into a bottle shape. Other containers may be co-extrusion blow moulded, where the parison is blown against a mould wall to achieve the desired shape online during the co-extrusion process.

Some containers further require high gas-barrier closures, formed by means of injection moulding.

Barrier materials are also used in rigid packages such as meat trays, although for most applications the rigid plastic material provides enough barrier and only the thin film on top needs improved performance.

Barrier films may also be used for such diverse applications as silage wrapping and the packaging of rolled newspapers for home delivery.

One issue that has slowed the rollout of barrier technologies is their effect on the recyclability of the plastic—this is particularly true for the bottle market. Many PET bottles now have a complex structure of virgin material on the exterior with recycled PET and barrier layers in the middle. If the barrier resin is not compatible with the recycling system then there can be considerable resistance to adoption of that technology. New materials are entering the market that are based on sustainable, renewable resources and/or that are biodegradable. An example of such a material that may be injection stretch blow moulded into bottles or formed into thin films for packaging applications is polylactic acid (PLA) synthesised from corn. PLA has poor gas barrier properties and also relatively poor water vapour barrier properties, and in order to preserve biodegradability or sustainability status would benefit from being used with a biodegradable barrier based on renewable resources.

Another issue in manufacturing barrier films is the selection and management of appropriate plasticizers. A plasticizer is a substance added to polymeric materials to promote flexibility, workability, and elongation. For barrier films to work well, they must be very dry. Temperatures commonly used to satisfactorily dry the films can be in the order of 90-280° C. and higher. At these temperatures, the plasticizers either evaporate out or are distilled out as the water in the composition escapes. Low molecular weight plasticizers are particularly problematic as they have a measurable vapour pressure at drying and processing temperature. The addition of a humectant does not always assist in managing the plasticizers as at higher processing temperatures the capacity of the humectant to attract and retain moisture is not sustained. A further issue can arise during and even after processing. Plasticizer migration occurs when the plasticizer moves from the body of the plastic into the surface of the film or into other components of the plastic composite or laminate such as an adhesive, face material, or both. This can cause adhesion, processing and cosmetic problems such as bubbles and holes in the film and bleed-through of adhesive components into the face material.

BRIEF DESCRIPTION OF THE INVENTION

In one embodiment of the present invention there is provided a polymer composition including on a dry basis:
a) from 45 to 90% by weight of starch;
b) from 0.1 to 15% by weight of a water soluble polymer selected from polyvinyl alcohol, polyvinylacetate, and copolymers of ethylene and vinyl alcohol which have a melting point compatible with the molten state of the starch component;
c) from 5 to 45% by weight of one or more plasticizers having a molecular weight in the range of 50-6000, more preferably 50-2500 and still more preferably 100-400 and desirably selected from the group consisting of sorbitol, glycerol, maltitol, xylitol, mannitol, erythritol, glycerol trioleate, tributyl citrate, acetyl tri-ethyl citrate, glyceryl triacetate, 2,2,4-trimethyl-1,3-pentanediol diisobutyrate, polyethylene oxide, ethylene glycol, diethylene glycol or polyethylene glycol.

Preferably the starch is a high amylose starch and/or a modified starch selected from starches modified by reaction with a hydroxyl alkyl group, acetate or a dicarboxylic acid anhydride or a grafting polymer.

The plasticizer is preferably a non re-crystallizing plasticizer. At drying temperatures of 130° C. glycerol, sorbitol, erythritol and xylitol may all be released with any water present. It has also been found that some plasticizers migrate or bloom. In both cases, an optimum outcome is not achieved. In preferred polymer compositions, the plasticizer is selected from the group consisting of one or more of maltitol, xylitol and erythritol.

Optionally, the polymer compositions may also include on a dry basis from up to 2.5% by weight of a $C_{12-22}$ fatty acid or salt. They may also optionally include up to 3% of emulsifier having a hydrophilic lipophilic balance (HLB) value between 1 and 22. Other conventional additives and fillers may also be included in the polymeric compositions. Such additives may include other processing aids than those already identified, extenders, epoxidized oils, humectants, fillers, pigments, thermal stabilisers and antioxidants against discolouration and degradation, antimicrobial agents, UV/light stabilizers, lubricating agents, flame retardant, nanoparticles and antiblocking agents.

The compositions may contain small amounts of bound water, but only to the extent where the water does not evaporate under the processing conditions of the chosen process.

The polymeric compositions are suitable for extruding, co extruding or casting thin films for use alone or as part of a laminate structure. Other processing methods may also be used including co injection or injection moulding possibly followed by blow moulding (injection-blow-moulding and injection-stretch-blow-moulding), extruding or co extruding shapes including tubes for blow moulding (extrusion-blow-moulding), and extruded or coextruded and/or laminated sheet for subsequent thermoforming. Maltitol is found to be a particularly effective plasticiser when high processing temperatures are used in co-injection and co-extrusion processes.

The gas barrier properties of the films formed from the compositions of this invention, it is anticipated, outperform starch-based prior art compositions and current common commercial barrier materials at elevated humidities. The films formed from the polymers of the invention have excellent oxygen barrier properties in particular having an oxygen permeability coefficient, for example, below 0.1 cm$^3$ mm/m$^2$ day atm at relative humidities up to 60% RH and below 0.7 cm$^3$ mm/m$^2$ day atm at relative humidities up to 90% RH. The films formed form the compositions of the invention further have a carbon dioxide permeability coefficient below 0.5 cm$^3$ mm/m$^2$ day atm at relative humidities up to 60% RH and below 0.9 cm$^3$ mm/m$^2$ day atm at relative humidities up to 90% RH.

The films formed from the compositions may be laminated with other packaging polymers such as PET, PE, (BO)PP, LDPE and polylactic acid by co-extrusion, co-injection moulding, film blowing or thermal lamination techniques. The laminates with PET and polylactic acid are suitable for use as preforms in forming beverage bottles for soft drinks, beer or condiments. Other injection stretch blow moulded laminate products include hot fill PET or PP containers for soups, juices and processed fruit and cosmetic bottles. The material may be used in injection moulded PP caps or closures for oxygen and CO$_2$ barrier applications. Extrusion blow moulded PE bottles for food and pharmaceutical applications may also contain a co-extruded film of this invention. The laminates with PE, PP, BO-PP and polylactic acid (PLA) are suitable for use in thin film packaging applications such as snack wraps or thin film lids for modified atmosphere packaging of products such as meat. Adhesion is excellent with polar materials such as PET, whereas for adhesion with non-polar materials such as PP common tie layer resins are indicated. Suitable tie layer materials include grafted polymers based on PP, EVA, LDPE or LLDPE. It is also found that the polymer compositions of the invention when formed into films can be used as a base to which marketing, sales and promotional materials such as temporary and permanent printing can be applied which may lead to an increase their adoption by the packaging industry, particularly that directed at retail consumer products.

The material may be used in an in-mold labelling or in-mold decoration process to apply a barrier film to the surface of an injection molded part, or to produce a printed or decorated part in a single injection molding shot. The substrate for the in-molding decoration process may be either conventional plastic, or a biodegradable polymer.

The film may also be used as an insert in an injection molding process to produce a barrier layer encapsulated within an injection molded component, such as a closure for carbonated beverages.

Because the barrier film of this invention is biodegradable and water soluble it is suitable for use with recyclable plastics. For example it is suitable for use with PET because it dissolves in the caustic wash process used in the recycling of PET. It is suitable for use with PLA because it is compostable and will biodegrade at least as fast as PLA.

DETAILED DESCRIPTION OF THE INVENTION

The amount of starch, modified and/or unmodified, in the composition is limited by the required addition levels of all the other components: it makes up the balance. The starch may, be derived from wheat, maize, potato, rice, oat, arrowroot, and pea sources. One preferred source is maize (corn) starch. Unmodified starch is a cheap biodegradable raw material from renewable resources that may contribute to the barrier properties of the final product and is therefore highly attractive for this application. However, its use is limited by the occurrence of retrogradation (crystallisation resulting in brittleness), limited optical clarity of the resulting formed products, limited film-forming properties and limited elasticity for stretching. One preferred concentration range for unmodified starch as a fraction of the total amount of starch is 0 to 50% although levels up to 100% may be possible.

If modified starch is present, the upper limit is largely determined by its cost. This component may contribute structural benefits to the resulting material, including good film-forming properties, good optical properties, and resistance to retrogradation. Retrogradation and crystallization of starch may relate to one of the most important practical problems with starch based plastics, as they have a tendency to become brittle over time, analogous to the staling process in baked goods. Typical modified starches include those having an hydroxyalkyl $C_{2-6}$ group or starch modified by reaction with a dicarboxylic acid anhydride. One preferred modified starch is hydroxypropylated amylose. Other modified starches can be hydroxyethyl or hydroxybutyl substituted to form hydroxyether substitutions. Acetates or anhydrides such acetic, maleic, phthalic or octenyl succinic anhydride can be used to produce modified starches which are ester derivatives. The degree of substitution [the average number of hydroxyl groups in a unit that are substituted] is preferably 0.05 to 2. If modified starch is used, one preferred starch is a high amylose maize (corn) starch, more preferably a hydroxypropylated high amylose starch. The minimum level of hydroxypropylation in this product is 3.0%, more preferably 6.0%. Typical values are 6.1 to 6.9%. For cost saving reasons and for property optimisation reasons it is possible to substitute part of this starch with:

1) higher or lower levels of hydroxypropylation,
2) a higher level of unmodified starch. This may be possible if the level of hydroxypropylation of the modified starch is increased, or
3) a starch modified with octenyl succinic anhydride (OSA), which has a higher degree of hydrophobicity. The addition of this modified starch increases water resistance with increasing degree of substitution. This is relevant when the films formed from the polymers of the invention are incorporated as a barrier layer in packaging applications containing fluids, as the relative humidity in these situations may be up to 90%. The acetyl linkages in the OSA starch ensure that the material retains biodegradability upon access to water and a biologically active environment.
4) a starch co-polymer, preferably consisting of a styrene butadiene grafted with starch. This material improves impact resistance of the product.

The polymer component b) of the composition is preferably compatible with starch, water soluble and has a melting point compatible with the processing temperature/s of the starch or starches selected. Polyvinyl alcohol is one preferred polymer but polymers of ethylene-vinyl alcohol, ethylene vinyl acetate or blends with polyvinyl alcohol may also be used. The selected polymer should preferably not be water soluble at room temperature conditions. PVOH offers a combination of excellent film forming and binder characteristics, good elasticity and aids processing of starch-based formulations. PVOH is produced by the hydrolysis of polyvinylacetate which is made by the polymerization of vinyl acetate monomer. The fully hydrolyzed grades contain few, if any, residual acetate groups; while partially hydrolyzed grades retain some of the residual acetate groups. Fully hydrolyzed grades dissolve in hot (90° C.) water, and remain in solution when cooled to room temperature. Preferred grades of PVOH include those having weight average molecular weight in the range 90,000-112,000, intrinsic viscosity in the range 25-70 mPa·s and hydrolysis in the range of 99.0-99.8%. The higher molecular weight grade PVOH appears to improve impact resistance and to reduce water sensitivity. Increasing the level of PVOH significantly increases elongation at break and decreases Young's modulus. Film forming may become difficult below 6%. Therefore, a preferred concentration range for thin film barrier material is 4 to 12% and the preferred concentration range for barrier materials to be applied in injection-blow moulded bottles is 4% to 12%.

A range of plasticizers and humectants are useful in the compositions of the invention in order to aid processing and to control and stabilize the mechanical properties of the barrier material, and in particular in reducing dependency on moisture content and relative humidity. The desired plasticizer content depends primarily on the required processing behaviour during the (co)-extrusion or (co)-injection moulding process and subsequent blowing or stretching processes as well as on the required mechanical properties of the end product. Cost and the purpose to which the film is to be put such as, for example, for use in food packaging are important issues in choosing the appropriate plasticizer. The plasticizer plays a triple role: it provides suitable rheology for the extrusion compounding process and for the lamination process, it positively affects the mechanical properties of the product and it may act as an anti-retrogradation or anti-crystallizing agent. Preferred plasticizers are those having a molecular weight in the range of 50-6000, more preferably 50-2500 and more preferably still 100-400 and which are desirably selected from the group consisting of sorbitol, glycerol, maltitol, xylitol, mannitol, erythritol, glycerol trioleate, tributyl citrate, acetyl tri-ethyl citrate, glyceryl triacetate, 2,2,4-trimethyl-1, 3-pentanediol diisobutyrate, polyethylene oxide, ethylene glycol, diethylene glycol or polyethylene glycol. Preferably the plastcizer is non crystallizing. The larger the number of OH groups, the more effective the plasticiser is in reducing crystallisation. In one preferred embodiment, the plasticizer is maltitol.

One preferred plasticizer content is 10-40% depending on the particular application and co-extrusion or lamination process.

Sorbitol, maltitol and xylitol function also as particularly good humectants. Glycerol helps dissolve the PVOH during processing. Some polyols (sorbitol and glycerol in particular) may exhibit migration to the surface of the film where either an opaque crystalline film may form in the case of sorbitol, or an oily film in the case of glycerol. Blending various polyols inhibits this effect to varying degrees. It is known that the polyol may have a synergistic effect with salt resulting in enhanced mechanical properties.

PEG compounds may be used as emulsifying agents, plasticizers or humectants. Polyethylene oxide and polyethylene glycol alternately or together may also provide an increased water resistance, to prevent swelling which may result in delamination in multi-layer structures (MLS).

Other plasticizers more commonly used in the PVC industry may also be suitable including tributyl citrate, 2,2,4 trimethyl-1,3-pentanediol diisobutyrate, and acetyl tri-ethyl citrate.

0 to 20% of a humectant or water binding agent or gelling agent may be used to act as a (co)plasticiser. Suitable examples are carrageenan, xanthan gum, gum arabic, guar gum, gelatine, sugar or glucose. Biopolymers such as carrageenan, typically used in food products as thickeners and partially soluble in cold water but fully soluble in hot water may be suitable for tailoring mechanical properties. By binding water these components may have a significant plasticizing function. Gelatine may be added to improve the mechanical properties and reduce moisture sensitivity. Xanthan Gum has a high water holding capacity and also acts as an emulsifier and in starch compositions has an anti-retrogradation effect. Gum Arabic may also be used as a texturiser and film former, and the hydrophilic carbohydrate and hydrophobic protein enable its hydrocolloid emulsification and stabilization properties. Guar gum has similar anticrystallisation effects in starch compositions. Another suitable humectant is glyceryl triacetate. Plasticisation and humectant effects may also be obtained or enhanced with salts such as sodium chloride and sodium hydroxide. Potassium salt, potassium acetate, calcium oxide and sodium iodide are also suitable. Calcium salt improves the rigidity and size stability of extruded starch materials, and may furthermore be used in combination with carrageenan to assist gelling.

Fatty acids and fatty acid salts such as stearic acid may also be used as a lubricating agent in the composition because it has shown better compatibility with starches than for example waxes. Stearic acid is hydrophobic and may therefore improve moisture sensitivity of the starch-based material. As well as stearic acid, salts such as calcium stearate may be used. The degree of saturation of the fatty acid portion of the emulsifier limits its ability to perform as required with more saturated fatty acids being preferred. Stearic acid is particularly useful as a processing aid, however in the presence of PEO or PEG it may not be necessary. Preferred levels of stearic acid are 0.5% to 1.5%. Sodium and potassium salts of stearic acid may also be used. Again cost can be a factor in the choice of this component but lauric, myristic, palmitic, linoleic and behenic acids are all suitable. The choice of appropriate processing aid is largely limited by the required resistance to delamination in MLS.

Sulfiting agents (sulfur dioxide, sodium sulfite, sodium and potassium bisulfites and metabisulfites) are added to many foods to prevent enzymatic and nonenzymatic browning and act in the compositions of the invention as antioxidants or reducing agents. Sulfites inhibit nonenzymatic browning by reacting with carbonyl intermediates, thereby preventing their further reaction to form brown pigments. Citric acid, often in conjunction with ascorbic acid or sodium bisulfite, has long been used as a chemical inhibitor of enzymic browning. One preferred concentration of potassium bisulfite for applications where browning is undesirable may up to 2%, possibly in conjunction with up to 2% ascorbic acid. Citric acid has been shown not to be of benefit at levels above 1%. Where the film is to be exposed to high temperature processing, thermal stabilizers such as Vitamin E or hindered phenols in amounts of up to 2% by weight are suitable.

Where an emulsifier is present in the composition, and the application of the film is to the packaging of food, the emulsifier is preferably a food grade emulsifier. Typically the selection of the emulsifier is based on its HLB value. Preferred emulsifiers are selected from food grade emulsifiers with HLB numbers between 1 and 22 and include propylene glycol monostearate, glycerol monoleate, glycerol trioleate, glycerol monostearate, acetylated monoglycerides (stearate), sorbitan monooleate, propylene glycol monolaurate, sorbitan monostearate, calcium stearoxyl-2-lactylate, glycerol monolaurate, sorbitan monopalmitate, soy lecithin, diacetylated tartaric acid esters of monoglycerides, sodium stearoyl lactylate, sorbitan monolaurate. Sodium stearoyl lactylate and glycerol monostearate are commonly used in starch systems.

TABLE 2

| Hydrophobic/Hydrophilic Balance (HLB) Values for some Emulsifiers | |
|---|---|
| Emulsifier | HLB Value |
| Sodium Stearoyl Lactylate (SSL) | 21.0 |
| Polysorbate 80 (Sorbitan Monooleate) | 15.4 |
| Polysorbate 60 (Sorbitan Monostearate) | 14.4 |
| Sucrose Monostearate | 12.0 |
| Polysorbate 65 (Sorbitan Tristearate) | 10.5 |
| Diacetyl Tartaric Ester of Monoglyceride (DATEM) | 9.2 |
| Sucrose Distearate | 8.9 |
| Triglycerol Monostearate | 7.2 |
| Sorbitan Monostearate | 5.9 |
| Succinylated Monoglyceride (SMG) | 5.3 |
| Glycerol Monostearate (GMS) | 3.7 |
| Propylene Glycol Monoester (PGME) | 1.8 |

Glycerol Monostearate is a lipophilic, non-ionic surfactant, which is particularly suitable for this application as it has a defoaming effect and anti-retrogradation effect in starch compositions. Glycerol monostearate added at levels ranging from 1-1.5% acts as an emulsifier to stabilise mechanical properties and increase homogeneity of the blend. Sodium Stearoyl Lactylate at 0.25% to 1.5% may be added to a plasticiser system to stabilise mechanical properties and increase homogeneity of the blend. Stearoyl Lactylate (as the sodium or calcium salt) is also commonly used as a dough strengthener and may hence act as an anti-retrogradation agent. Combinations of glycerol monostearate and sodium stearoyl lactylate result in faster stabilisation of properties. The HLB value follows the additive rule and is preferably of the order of 4 to 10 for a suitable mixture of SSL and GMS.

Water is added for the purpose of "gelatinising" (also called destructurising or melting) the starch into a polymeric gel structure. Water also may act like a plasticiser in the end-product in that it softens the material or reduces the modulus. The moisture content of the barrier material may vary at water activities or relative humidities (RH) below 30% or superior to 75%. In many barrier film and barrier bottle applications, the local relative humidity to which the barrier material is exposed may reach values of up to 90%. For stable mechanical, lamination, and barrier properties and for ease of processing at all temperatures, non-volatile plasticizers are preferred. Therefore some or all of the water may be dried off during or after the compounding stage and/or in the feeding stage of the subsequent injection moulding or film forming. This may be achieved by venting the extruder barrel, and/or on-line drying of the pellets. Any remaining water should be suitably bound with the aid of humectants to avoid foaming during the process, or significant changes in mechanical properties in use. Extrusion processing of unplasticized compositions is possible with free water concentrations as low as 10% and formulations with polyol plasticizers may be dried to 0% free water (measured by a Perkin-Elmer moisture balance at 130° C.) before injection moulding. The preferred free moisture content is the equilibrium moisture content of the formulation at the in-use RH range of the end product as determined by moisture desorption experiments. This depends on the specific composition of the formulation but may be in the range of 0-1%, more preferably at the lower end of this range.

Fillers which may be incorporated into the film forming compositions include calcium carbonate, kaolin, clay, titanium dioxide, talc, natural and synthetic fibres and may be selected according to the purpose of the composition.

EXAMPLES

The barrier materials of this invention may be formed from starch polymer compositions of the formulae set out in table 1.

The permeability to oxygen of selected common packaging materials and barrier films for packaging purposes is provided as a means of comparison in table 2. The permeability to carbon dioxide of selected common packaging materials and barrier films for packaging purposes is provided as a means of comparison in table 3.

TABLE 1

| | Compositions according to the invention | | | | | | | | | | |
|---|---|---|---|---|---|---|---|---|---|---|---|
| | composition | | | | | | | | | | |
| | Dry 1 % | Dry 2 % | Dry 3 % | Dry 4 % | Dry 5 % | Dry 6 % | Dry 7 % | Dry 8 % | Dry 9 % | Dry 10 % | Dry 11 % |
| Maize Starch type 1 | 49.40% | 49.40% | 49.4% | 49.4% | 49.4% | 49.4% | 49.40% | 49.40% | 49.40% | 49.80% | 58.40% |
| PVOH | 10% | 10% | 9.6% | 9.6% | 9.6% | 9.6% | 10% | 10% | 10% | 10% | 10% |
| Stearic Acid | 0.60% | 0.60% | 0.6% | 0.6% | 0.6% | 0.6% | 0.60% | 0.60% | 0.60% | 0.60% | 0.60% |
| Glycerol Monostearate | 1% | 1% | 1.0% | 1.0% | 1.0% | 1.0% | 1% | 1% | 1% | | 1% |
| Sodium Stearoyl Lactylate | 0.4% | 0.4% | 0.4% | 0.4% | 0.4% | 0.4% | 0.4% | 0.4% | 0.4% | | 0.4% |
| Maltitol | 19.50% | 19.50% | | 14.0% | 19.50% | | 19.50% | 19.50% | 14.50% | 20.00% | 15.00% |
| Sorbitol | | | | | | | | | 14.50% | | |
| Erythritol | 19.50% | | 19.50% | 14.0% | | 19.50% | | | | | |
| Xylitol | | 19.50% | 19.50% | 11.0% | | | 19.50% | 19.50% | 10.00% | 20.00% | 15.00% |
| Acetyl tri-ethyl citrate | | | | | 19.50% | 19.50% | | | | | |
| Total dry mix Water = variable | 100% | 100% | 100.0% | 100.0% | 100.0% | 100.0% | 100.0% | 100.0% | 100.0% | 100.0% | 100.0% |
| % TGA loss to 230° C. | 6.5% | 1.2% | 6.5% | 3.8% | | | 1.1% | 0.7% | 0.8% | 1.1% | 1.2% |
| % TGA loss held 10 min at 230° C. | 6.0% | 5.5% | 12.1% | | | | 2.5% | 3.0% | 3.0% | 3.2% | 3.2% |

TABLE 2

Oxygen permeability at 20-25° C. of selected commercial polymers and barrier materials from the literature.

| Material grade name | RH (%) | P (cm³ mm/m² day atm) average (stdev) | Source |
|---|---|---|---|
| PET | 0%-90% | 1.2-2.4 | [1] |
| PET | 0% | 2.2-3.8 | [2] |
| PP | 0-100% | 53-100 | [1] |
| PP | 0-100% | 58-99 | [2] |
| EVOH Eval-E | 0% | 0.02 | [1] |
| EVOH Eval-E | 100% | 0.477 | [1] |
| EVOH Eval-F | 0% | 0.01 | [1] |
| EVOH Eval-F | 100% | 0.776 | [1] |
| EVOH Eval-L | 0% | 0.0024-0.005 | [1] |
| EVOH Eval-L | 100% | 1.036 | [1] |
| Nylon MXD6 | 0% | 0.06-0.07 | [1] |
| Nylon MXD6 | 90% | 0.32 | [1] |
| Nylon MXD6 | 100% | 1.055 | [1] |
| WO 90/14938 formulas 1-4 | 11% | 0.657 | [3] |
| WO 90/14938 formulas 1-4 | 52% | 1.96-7.22 | [3] |
| WO 90/14938 formulas 1-4 | 75% | 131-460 | [3] |

[1] "Permeability and other film properties of plastics and elastomers," Plastics Design Library, 1995
[2] "Plastics Packaging", Hernandez Selke and Culter ed., Hanser Verlag
[3] WO 90/14938 (Permeability quoted in ml (STP) cm × 1010/cm2 s cmHg The main components contributing to the barrier performance of the compositions of this invention are starch and PVOH. The polyol plasticizers also contribute to the barrier properties. Synergistic effects of the components, as well as any complexes that may be formed by these components in the extrusion process, may assist in significantly enhancing the oxygen barrier of the polymeric material of this invention.

TABLE 3

Carbon Dioxide permeability at 20-25° C. of selected polymers and barrier materials according to the literature.

| Material grade name | RH (%) | P (cm³ mm/m² day atm) average (stdev) | Source |
|---|---|---|---|
| PET | 0% | 4.7-9.8 | [1] |
| PET | | 8-20 | [2] |
| PP | 0% | 208 | [1] |
| PP | | 213 | [2] |
| EVOH Eval-E | 0% | 0.251 | [1] |
| EVOH Eval-E | 90% | 0.886 | [1] |
| EVOH Eval-E | 100% | 3.117 | [1] |
| EVOH Eval-F | 0% | 0.026 | [1] |
| EVOH Eval-F | 90% | 1.432 | [1] |
| EVOH Eval-F | 100% | 8.230 | [1] |
| Nylon MXD6 | 0% | 0.61 | [3] |

[1] "Permeability and other film properties of plastics and elastomers," Plastics Design Library, 1995
[2] "Plastics Packaging", Hernandez Selke and Culter ed., Hanser Verlag
[3] Hu et al, Polymer 46 (2005) 2685-2698

The barrier layers of this invention are transparent and are ideally suited for multi-layer packaging items that allow visibility of the product. The optical properties of the barrier material of this invention were measured on a 250 micron sheet, and resulted in a haze of 8-10% (ASTM D1003-00), light transmission of 85-95% (ASTM D1746-92) and a 600 specular gloss of 84.7% (ASTM D2457-97). As the film tested was 10 times the thickness of the barrier layer applied, this barrier material achieves the required optical properties for a barrier layer of 20-40 micron thickness in PET soft drink bottles, namely light transmission superior to 90% and a haze inferior to 3% and yellowing characterized by a lab b* reading inferior to 2. EVOH-F at a 15 micron thick layer has a haze of 1.5%, PET at 12-14 micron has a haze of 2.5-3.9%. PP at 20 to 22 micron has a haze of 2.2-3.5%.

Manufacturing Method

The material is manufactured by means of extrusion compounding, using co- or counter-rotating twin screw or selected design single screw extruders. The preferred process is twin screw co-rotating compounding, with an extrusion pressure of at least 10 Bar and with a screw speed of at least 100 RPM. Water may be added to the process (by means of liquid injection together with the plasticizers) dependent on the level and nature of other plasticizers. Removal of water may be carried out by means of convective drying, contact heating, IR heating, or microwave drying for the extrudate strands, a centrifuge and a fluidised bed for granulate, or barrel venting or a combination of these. Granulate may be obtained by means of underwater pelletising, die face cutting or strand cooling and cutting.

Co-Injection Stretch Blow Moulding with PET

Co-Injection

The composition may be injection moulded using conventional screw driven or injection driven processes with hot or cold runner systems. The compositions of this invention have been designed to be compatible with PET for co-injection moulding at elevated temperatures. It is expected that the compositions of this invention will be successfully co-injection moulded on an industry standard preform co injection machine. The cold half of the preform mould it is expected will be standard design. The hot half may be of special design. The two materials can be conveyed in separate manifolds, and combined in the nozzle to form an annular flow pattern. There may be separate temperature control of each manifold, with good thermal separation. The nozzle is the only part of the manifold system where both material streams must be at the same temperature. This temperature is typically around 250-280° C. to suit the requirements of PET. The processing conditions for a typical 28 g preform for a ½ liter bottle are shown in table 4.

Materials may be dried as required in standard industry de-humidifying driers.

TABLE 4 processing conditions for a typical 28 g preform for a ½ l bottle.

| | Cycle (s) | Shot size (mm³) | Inject speed (mm/s) | Temperatures (° C.) | | | Pressure (Bar) | |
|---|---|---|---|---|---|---|---|---|
| | | | | Barrel | Manifold | Nozzle | Injection | Back |
| A | 15-30 | 44 | 45 | 210-290 | 270-290 | 250-300 | 40-80 | 1-5 |
| B | | 75 | 22 | 80-220 | 160-220 | | 20-100 | 1-5 |

Bottle Blowing

Compositions of this invention may be readily blown into bottles on conventional stretch blow moulding lines. Preform temperatures may be in the range 100 to 120° C., and a blow moulding pressures of 35 to 45 bar are likely to be used.

Adhesion

Adhesion with PET is expected to be excellent due to the polar nature of the barrier material having a surface tension of >50 dynes/cm and due to the lack of crystallinity-related shrinkage.

Mechanical Properties

A barrier layer typically makes up about 5-20% of the total layer thickness of the multilayer structure. Therefore its mechanical properties will contribute somewhat to the mechanical properties of the final product. Where the mechanical properties of the barrier material are lower, some compensation may be required by slightly increasing the wall thickness of the container, but never by more than the barrier layer thickness, hence 10% increase at the most, offset by the advantage of excellent barrier properties at a cost saving compared to conventional barrier materials. Also important is the elongation behaviour as in the bottle blowing process the axial stretch is about 1.5× to 3.5× and the hoop stretch is about 3.5× to 5×. This stretching occurs in heated form, and the barrier layer is supported by the matrix. The mechanical properties of barrier materials according to the invention are compared to commercial materials for injection stretch blow moulding in Table 5.

TABLE 5

| Property | ASTM | This invention | PET | PLA | MXD6 |
|---|---|---|---|---|---|
| Elastic modulus (MPa) | D638 | 20-450 | 3400-3800 | 3000-3400 | 3500-4700 |
| Tensile strength (MPa) | D638 | 7-30 | 160-190 | 90-120 | 220 |
| Elongation at break (%) | D638 | 30-340 | 100-120 | 150-170 | 2-3 |

Cast Film Extrusion

The barrier material of the invention may also be used as a single layer product, with optional printing and varnishes. The resulting films could be thin, for confectionery bars or pouches, or thick, for thermoforming applications, as this material is also ideally suited for thermoforming processing.

The formulations of this invention are suitable for extrusion casting of thin films. Those skilled in the art would be able to select suitable plasticizer levels to obtain the required melt strength and mechanical properties for the required application.

The preferred compositions used in this invention are cold sealable and heat sealable.

Biaxially Oriented Film Extrusion

The barrier materials of the invention can be coextruded into a laminate or combined with conventional film polymers (e.g. biaxially oriented PP) in a separate lamination step. The other materials may be any suitable packaging polymer such as polypropylene (PP) polyethylene (PE) or low density polyethylene (LDPE), or biodegradable polymers such as polylactic acid (PLA) or other polyesters.

The barrier material of this invention is preferably used as the middle layer in a three layer laminate or a 5 to 7-layer product if additional tie layers and protective coatings are deemed necessary.

In addition it could also be the internal or external layer of a two-layer packaging wrap, if water-resistance is only required on one side, or if water vapor barrier is not required for the packaged product. Those skilled in the art would be able to select suitable plasticizer levels to obtain the required viscosity compatibility for the polymer combination of interest. In most cases a feed block is adequate for the control of the various material layers, in other cases a multi-manifold die may be more desirable.

Multilayer Compatibility

Adhesion of the films of the invention is excellent with polar materials such as PET, whereas for adhesion with non-polar materials such as BO-PP common tie layer resins are indicated.

Suitable tie layer materials include grafted polymers based on PP, EVA, LDPE or LLDPE. For adhesion to PP Orevac PPC from Atofina is suitable for clear applications and Orevac 18729 or 18910 from Atofina for opaque applications. Other suitable tie layers include EVA copolymers, acrylic copolymers and terpolymers, ionomers, metallocene PE, ethylene acrylic ester terpolymers and ethylene vinyl acetate terpolymers. Anhydride modified polymers (such as DuPont Bynel CXA50E662) are also suitable for dry formulations of this invention. The barrier material is inherently antistatic, and may be printed or coated with all standard printing techniques. The adhesion with inks and coatings is excellent for solvent based inks, as determined with the tape peel test. The tear propagation resistance is (ASTM D 1938) 200-400 Nm and the kinetic coefficient of friction (ASTM D 1434) is 0.1-0.3.

Film Blowing

Much along the principles described above for multilayer biaxially oriented film extrusion, this barrier material can be co-extruded into blown film, using similar tie layer principles if required.

The compositions of this invention are unique among barrier materials in that they offer better barrier properties than the most commonly used materials (e.g. MXD6) at a significantly lower costs, allowing for cost savings both in terms of the thickness of the layer and the price of the compound.

The nature of the ingredients of this barrier material ensures their price stability compared to oil-based polymers, and price competitiveness compared to MXD6. They are commonly available profitably at 80% of the price of MXD6.

Furthermore the water solubility of the compositions offers excellent recyclability to the matrix materials with which this barrier is combined. If used as a single-layer structure barrier packaging, this material is furthermore compostable and biodegradable and will disintegrate and biodegrade as litter at environmental temperatures. These unique properties are due to the combination of compounds in the formula.

Those skilled in the art will realize that this invention may be implemented in a variety of ways without departing from the essential teachings of the invention.

The invention claimed is:

1. A barrier material that prevents or minimizes the transmission of gases through said material comprising a biodegradable polymer composition including on a dry basis:
   a) from 45 to 90% by weight of starch;
   b) from 0.1 to 15% by weight of a water soluble polymer selected from polyvinyl alcohol, polyvinylacetate, and copolymers of ethylene and vinyl alcohol which have a melting point compatible with the molten state of the starch component; and
   c) from 5 to 45% by weight of two more plasticizers selected from maltitol, xylitol, and erythritol, and optionally sorbitol, glycerol, mannitol, glycerol trioleate, tributyl citrate, acetyl tri-ethyl citrate, glycerol triacetate, 2,2,4-trimethyl-1,3-pentanediol diisobutyrate, ethylene glycol, or diethylene glycol.

2. The barrier material of claim 1 wherein said material has an oxygen permeability coefficient below 0.1 cm³ mm/m² day atm at a relative humidity below 60%.

3. The barrier material of claim 1 wherein said material has an oxygen permeability coefficient below 0.7 cm³ mm/m² day atm at a relative humidity below 90%.

4. The barrier material as claimed in claim 1 wherein the starch is a high amylose starch and/or a modified starch selected from starches modified by reaction with a hydroxyl alkyl group, acetate or a dicarboxylic acid anhydride or a grafting polymer.

5. The barrier material as claimed in claim 1 additionally including on a dry basis up to 2.5% by weight of a C12-22 fatty acid or salt.

6. The barrier material as claimed in claim 1 additionally including up to 3% of emulsifier having a hydrophilic lipophilic balance (HLB) value between 1 and 22.

7. The barrier material as claimed in claim 1 wherein component b) is a polyvinyl alcohol.

8. A co-injection moulded laminate of polyethylene terephthalate or polylactic acid and the barrier material as claimed in claim 1.

9. A co-extruded or monolayer film of the barrier material as claimed in claim 1 for use in an in-mold labelling process to produce a printed or labelled injection molded component.

10. A co-extruded or monolayer of the barrier material as claimed in claim 1 for use as a barrier layer in an in-mold labelling and/or in-mold decoration process.

11. A co-injection moulded laminate pre-form as claimed in claim 9 for blow moulding into beverage bottles.

12. A co-extruded laminate of polyethylene, polypropylene or polylactic acid with a barrier material as claimed in claim 1.

13. A monolayer of a barrier material as claimed in claim 1, for thin film packaging applications.

14. A co-extruded laminate as claimed in claim 13, for thin film packaging applications.

15. Use of the biodegradable polymer composition as defined in claim 1 as a barrier material.

16. Use of a co-extruded or monolayer film of the barrier material as claimed in claim 1 in an in-mold labelling process to produce a printed or injection molded component.

17. Use of a co-extruded or monolayer film of the barrier material as claimed in claim 1 as a barrier layer in an in-mold labelling and/or in-mold decoration process.

18. Use of a monolayer of the barrier material as claimed in claim 1 for thin film packaging applications.

19. The barrier material of claim 1 further including fillers or nanoparticles.

20. The barrier material of claim 19 wherein said filler is selected from calcium carbonate, kaolin, clay, titanium dioxide, talc, natural fibres, and synthetic fibres.

21. The barrier material as claimed in claim 4 wherein the hydroxy alkyl group is selected from a hydroxypropyl group, a hydroxyethyl group, and a hydroxybutyl group.

22. The barrier material as claimed in claim 4 wherein the dicarboxylic acid anhydride is selected from acetic anhydride, maleic anhydride, phthalic anhydride, and octenyl succinic anhydride.

23. The barrier material as claimed in claim 4 wherein the modified starch is a hydroxypropylated high amylose starch.

\* \* \* \* \*